United States Patent Office 3,314,917
Patented Apr. 18, 1967

3,314,917
POLY-α-OLEFIN COMPOSITIONS CONTAINING THIONOPHOSPHINE SULFIDES AS STABILIZERS
Sheldon Herbstman, Bronx, N.Y., assignor to Stauffer Chemical Company, New York, N.Y., a corporation of Delaware
No Drawing. Filed Apr. 2, 1964, Ser. No. 356,974
4 Claims. (Cl. 260—45.7)

This invention relates to polyolefin compositions. More particularly, the invention is concerned with the stabilization of poly-α-olefin compositions against deterioration caused by exposure to actinic radiation by means of certain organic thiophosphorus compounds.

It is known that poly-α-olefins such as polyethylene, polypropylene and the like are peculiarly susceptible to deterioration in the presence of actinic radiation of the type exemplified by sunlight and ultra-violet light. The deterioration is initially manifested as a weakening of tensile strength of the polymer and on continued exposure mechanical failure occurs. In fact, prolonged irradiation can degrade the polymer to the point whereby it is transformed into a powdery mass. It is generally conceded that the degradation is a photo-oxidation phenomenon, a conclusion which is supported by the detection of carbonyl functions in the polymer molecule during the early stages of the breakdown.

Since many polymers, particularly poly-α-olefins, exhibit limited innate resistance to photo-oxidation, at least for extended periods of exposure, the commercialization of a plastic often depends on the development of a satisfactory stabilizer. Moreover, the efficiency of U.V. stabilizers varies considerably in different polymeric systems. For example, a particular stabilizer capable of giving excellent results when used in conjunction with halogen-containing polymers such as polyvinyl chloride or polyvinylidine chloride may be unsuitable for protecting poly-α-olefin resins. One theory commonly advanced to explain such varying behavior holds that the mechanism of stabilization is not identical in all polymeric systems. Thus, the fact that a particular stabilizer is effective in halogen-containing polymers may possibly be attributable to its functioning as a scavenger for hydrogenhalide whereas such a mechanism would have no significance in a poly-α-olefin polymeric system. Nor are ultraviolet stabilizers which are adapted for cellulosic esters such as cellulose triacetate, cellulose acetate butyrate, etc. necessairly effective in a poly-α-olefin resin. Although certain broad generalizations can be inferred, the stabilizer art as presently practiced is essentially an empirical technique and as a consequence the development of an ultra-violet inhibitor for a particular polymer may involve a considerable amount of trial and error experimentation.

With the realization that the poly-α-olefins constitute a class of plastic materials having a wide range of useful properties, considerable work and effort has been channelled into the development of suitable stabilizers for the purpose of extending and improving the usefulness of this polymeric system. Much of the attention has focused on polypropylene which is a poly-α-olefin recently come into prominence because of its general superiority to polyethylene and many other plastics. As new uses and applications have opened up for polypropylene, there exists a concurrent need to develop suitable U.V. stabilizers for the polymer in order that it may be used in areas requiring prolonged exposure to sunlight, weathering and other severe environmental conditions.

It has now been discovered that the use of certain organic thiophosphorus compounds are unusually effective in protecting poly-α-olefins against deterioration brought about by exposure to actinic radiation and the provision of poly-α-olefin compositions stabilized in the aforedescribed manner constitutes a primary object and purpose of this invention. Other objects and purposes will become apparent as the description proceeds.

In accordance with the present invention, I have succeeded in producing poly-α-olefin compositions exhibiting unusually high resistance against photo-oxidation by incorporating in the said poly-α-olefin composition as a U.V. absorber or stabilizer a hydrocarbylthionophosphine sulfide wherein the hydrocarbyl residue contains a total carbon content of from 1 to 30 carbon atoms as exemplified by alkyl of from 1 to 18 carbon atoms, phenyl, substituted phenyl wherein the substituents can be alkyl as above shown, chlorine, lower alkoxyl, phenyl and the like, and naphthyl. Exemplary thionophosphine sulfides of the above described class include the following:

methylthionophosphine sulfide
n-propylthionophosphine sulfide
n-hexylthionophosphine sulfide
isooctylthionophosphine sulfide
hexadecylthionophosphine sulfide
phenylthionophosphine sulfide
1-naphthylthionophosphine sulfide
1-biphenylylthionophosphine sulfide
p-methoxyphenylthionophosphine sulfide
p-tolylthionophosphine sulfide
3-chlorophenylthionophosphine sulfide The thionophosphine sulfides which are contemplated herein as U.V. stabilizers for poly-α-olefins are in many instances known chemical entities, the description and preparation of which can be found in the technical literature, and in this connection reference is made to an article by P. E. Newallis, J.O.C., 27, 3829 (1962). In general, the thionophosphine sulfides are prepared by heating a mixture of hydrogen sulfide and a phosphonothioic dichloride in accordance with the following scheme:

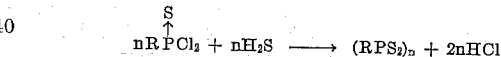

wherein $n$ is an integer of from 1 to 5, although the principal value is 2 since the thionophosphine sulfides exist chiefly in the form of their dimer. The reaction gives exceptionally high yields and is moreover applicable to a great diversity of chemical structures including both the aromatic and aliphatic series of organic compounds.

In practicing the invention the thionophosphine sulfide stabilizer can be blended or incorporated into the poly-α-olefin compositions by any of the conventional methods commonly used for mixing such materials with resins and plastics. A typical procedure comprises milling on heated rolls, although deposition from solvents and dry blending are other well known techniques.

The poly-α-olefin compositions stabilized in accordance with the invention exhibit an extended life expectancy and are much more useful and practical then unstabilized poly-α-olefins and moreover possess a wide diversity of uses including out-of-door installations under prolonged exposure to sunlight and the elements. The poly-α-olefins stabilized as contemplated herein can be cast, extruded, rolled or molded into sheets, rods, tubes, piping, filaments and other shaped articles, including sheets or films ranging from 0.5 to 100 mils in thickness. The polymer compositions of my invention can be applied as coatings to paper, cloth, wire, metal foil and are suitable for the manufacture of synthetic fibers and fabrics. Although the quantity of stabilizer is not particularly critical, it is recommended that the concentration based on the weight of the polymer be maintained in the range of 0.01 to about 5.0%.

The thionophosphine sulfides as described herein are suitable for stabilizing a wide variety of solid poly-α-olefin compositions against deterioration resulting from exposure to actinic radiation. In this connection, mention is made of any of the normally solid polymers derived from the polymerization of α-mono-olefinic aliphatic hydrocarbons containing from two to ten carbon atoms. Typical poly-α-olefins include polyethylene, polypropylene, poly(3-methylbutene-1), poly(4-methylpentene-1), poly(pentene-1), poly(3,3-dimethylbutene-1), poly(4,4-dimethylbutene-1), poly(octene-1), poly-(decene-1), and the like. I have ascertained that the thionophosphine sulfides of the invention are particularly useful for preventing photo-degradation by ultra-violet light or sunlight of the highly crystalline polyolefins such as isotactic polypropylene. Isotactic polypropylene is a stereo-regular polymer wherein the monomeric units are linked predominantly end-to-end rather than the more common arrangement consisting of a distribution of linear and cross-linked units. Moreover, the substituents attached to the chain are systematically disposed in a configuration which tends to promote an orderly and close alignment of the molecules. Such stereo-regular polymers exhibit a high degree of crystallinity and are much superior in physical properties to amorphous polymers having a random distribution of monomeric units. For a fuller description of crystalline polymers, reference is made to the Scientific American, 197 No. 3, pages 98–104 (1957); 205 No. 2, pages 33–41 (1961).

Although the molecular weight of poly-α-olefins varies over wide limits, the U.V. stabilizer compounds of the invention are not restricted to any particular molecular weight range of polymer, and in fact it has been my finding that excellent protection can be achieved with poly-α-olefins ranging in molecular weight from about 15,000 to about 20,000. Moreover, the so-called poly-α-olefin waxes are likewise susceptible to U.V. stabilization by means of the compounds of the invention.

The following examples illustrate the procedure for preparing stabilized poly-α-olefin compositions of the invention, although the inclusion of such examples is not to be taken as limiting or otherwise imposing any restriction on the invention, and it is to be understood that variations in practicing the same without departing from the scope or spirit thereof will be apparent to those skilled in the art to which the said invention pertains.

*Example 1*

A dry blend consisting of 0.5% of the U.V stabilizer of the invention and 50 g. of isotactic polypropylene was subjected to extrusion-compounding in the usual manner at a temperature of 400° F. for six minutes at 2000 p.s.i. The blended polymer was extruded into a 25 ml. sheet and thereafter cut into square samples measuring 2 inches. A like sample containing no stabilizer was also prepared and tested. The samples were then exposed in a Xenon Arc Weatherometer operating at 6000 watts. The water cycle was adjusted whereby each sample was subjected to 18 minutes of water spray for each two hours of dry exposure. Exposure damage to the samples of polypropylene was assessed with respect to change of structural strength. The results of the test established that the phenylthionophosphine sulfide protected the polypropylene for 1343 hours before embrittlement had set in.

The exposure is reported as the number of hours in the Weatherometer which produces structural failure of the sample which for the purposes of these tests refers to the degree of brittleness which causes the samples to break when flexed through 180°.

The Weatherometer as used in compiling the data and tests described herein was purchased from the Atlas Electric Devices Company, Chicago, Illinois. The instrument is identified as a 6000 watt Xenon Arc Weatherometer Model 60 W.

*Example 2*

The procedure given in Example 1 was repeated but in this instance the stabilizer was p-methoxyphenyl thionophosphine sulfide. Embrittlement of the test sample occurred after an exposure of 580 hours.

The polypropylene resin as used in the above described examples is an unstabliized general purpose, high molecular weight polypropylene of the isotactic or crystalline type. Typically, it has a melt index of 4 at 230° C. and a specific gravity of 0.905. The resin was purchased under the trade name Profax and further identified as number 6501, type P-02004 and is supplied in the form of natural flakes. We have also used other commercially available grades of unstabilized isotactic polypropylene resin, and in this connection, mention is made of unstabilized Avisun polypropylene and unstabilized Shell polypropylene. The results obtained in using the various grades and types of polypropylene were in general agreement.

I claim:
1. A stabilized poly-α-olefin composition comprising a solid poly-α-olefin formed from an α-mono-olefinic aliphatic hydrocarbon having from 2 to 10 carbon atoms and as a stabilizer therefor a stabilizing quantity of a hydrocarbylthionophosphine sulfide wherein the hydrocarbyl group contains from 1 to 30 carbon atoms.

2. A stabilized poly-α-olefin composition comprising solid polypropylene and as a stabilizer therefor 0.01% to 5% by weight based on the polypropylene of a hydrocarbylthionophosphine sulfide wherein the hydrocarbyl group contains from 1 to 30 carbon atoms.

3. A stabilized poly-α-olefin composition comprising solid polypropylene and as a stabilizer therefor 0.01% to 5% by weight based on the polypropylene of phenylthionophosphine sulfide.

4. A stabilized poly-α-olefin composition comprising solid polypropylene and as a stabilizer therefor 0.01% to 5% by weight based on the polypropylene of p-methoxyphenylthionophosphine sulfide.

References Cited by the Examiner

FOREIGN PATENTS

| | | |
|---|---|---|
| 928,768 | 6/1963 | Great Britain. |
| 1,099,535 | 2/1961 | Germany. |

LEON J. BERCOVITZ, *Primary Examiner.*

M. J. WELSH, *Assistant Examiner.*